US008144704B2

(12) United States Patent
Miyajima et al.

(10) Patent No.: US 8,144,704 B2
(45) Date of Patent: Mar. 27, 2012

(54) IP COMMUNICATION APPARATUS AND IP COMMUNICATION METHOD OF SUCH APPARATUS

(75) Inventors: Akira Miyajima, Kanagawa (JP); Yasuo Nishida, Kanagawa (JP); Hidenobu Ueki, Tokyo (JP)

(73) Assignee: Panasonic Corporation, Osaka (JP)

( * ) Notice: Subject to any disclaimer, the term of this patent is extended or adjusted under 35 U.S.C. 154(b) by 495 days.

(21) Appl. No.: 12/050,515

(22) Filed: Mar. 18, 2008

(65) Prior Publication Data

US 2008/0232362 A1  Sep. 25, 2008

(30) Foreign Application Priority Data

Mar. 20, 2007  (JP) ................................. 2007-072109

(51) Int. Cl.
*H04L 12/28* (2006.01)
(52) U.S. Cl. ......... 370/389; 370/392; 370/401; 370/384
(58) Field of Classification Search .................. None
See application file for complete search history.

(56) References Cited

U.S. PATENT DOCUMENTS

| 7,929,419 | B2* | 4/2011 | Sprague ........................ 370/218 |
| 2002/0141384 | A1* | 10/2002 | Liu et al. ....................... 370/352 |
| 2004/0139228 | A1* | 7/2004 | Takeda et al. ................. 709/245 |
| 2004/0139230 | A1* | 7/2004 | Kim .............................. 709/245 |
| 2005/0105543 | A1 | 5/2005 | Ikenaga et al. |
| 2005/0286519 | A1* | 12/2005 | Ravikumar et al. ........... 370/389 |
| 2006/0095401 | A1* | 5/2006 | Krikorian et al. ................. 707/1 |
| 2007/0248085 | A1* | 10/2007 | Volpano ........................ 370/389 |
| 2007/0253418 | A1* | 11/2007 | Shiri et al. ..................... 370/392 |
| 2008/0039079 | A1* | 2/2008 | Iyer et al. ................... 455/432.1 |
| 2008/0075097 | A1* | 3/2008 | Kitada ........................... 370/401 |
| 2008/0259943 | A1* | 10/2008 | Miyajima et al. ............. 370/401 |

FOREIGN PATENT DOCUMENTS

| JP | 2005-117587 | 4/2005 |
| JP | 2005-151142 | 6/2005 |
| JP | 2005-260715 | 9/2005 |
| JP | 2006-295909 | 10/2006 |
| WO | WO 2006/049251 | 5/2006 |

OTHER PUBLICATIONS

English language Abstract of JP 2005-151142.
English language Abstract of JP 2006-295909, Oct. 26, 2006.
English language Abstract of WO 2006/049251, May 11, 2006.
English language Abstract of 2005-117587, Apr. 28, 2005.
English language Abstract of 2005-260715, Sep. 22, 2005.

* cited by examiner

*Primary Examiner* — Chirag Shah
*Assistant Examiner* — Jenkey Van
(74) *Attorney, Agent, or Firm* — Greenblum & Bernstein, P.L.C.

(57) ABSTRACT

An IP terminal apparatus has a SIP controller, a UDP packet controller, and an RTP controller. The SIP controller transmits and receives a call control message in order to establish a connection to and from a destination apparatus. The UDP packet controller transmits and receives media data with the destination apparatus in a media session after the connection was established. The RTP controller obtains source port number information of a media data packet that the UDP packet controller has received from the destination apparatus, and sets the obtained source port number as a destination port number for a packet to be transmitted to the destination apparatus. Thereby, a feasible range of NAT traversal can be improved in a simple and secure manner, even when at least one relay apparatuses employs symmetric NAT.

5 Claims, 15 Drawing Sheets

Fig.2

| | | Call receiver | | | |
|---|---|---|---|---|---|
| | | Full cone (F) | Restricted cone (A) | Port restricted cone (P) | Symmetric (S) |
| Call initiator | Full cone (F) | F-F | F-A | F-P | F-S |
| | Restricted cone (A) | A-F | A-A | A-P | A-S |
| | Port restricted cone (P) | P-F | P-A | P-P | P-S |
| | Symmetric (S) | S-F | S-A | S-P | S-S |

Fig.5

| ID | Telephone number | NAT type |
|---|---|---|
| 1 | 12345678 | Full cone |
| 2 | 29384756 | Symmetric |
| 3 | 94837294 | Restricted cone |
| ⋮ | ⋮ | ⋮ |

Fig.15

| | | Call receiver | | | |
|---|---|---|---|---|---|
| | | Full cone (F) | Restricted cone (A) | Port restricted cone (P) | Symmetric (S) |
| Call initiator | Full cone (F) | A | A | A | B |
| | Restricted cone (A) | A | A | A | B |
| | Port restricted cone (P) | A | A | A | - |
| | Symmetric (S) | B | B | - | - |

IP COMMUNICATION APPARATUS AND IP COMMUNICATION METHOD OF SUCH APPARATUS

BACKGROUND OF THE INVENTION

1. Field of the Invention

The present invention relates to an IP (Internet Protocol) communication apparatus and an IP communication method of the apparatus and system, the IP communication apparatus being connected to a wide-area network via a relay apparatus that has a NAT (Network Address Translation) function.

2. Description of Related Art

Conventionally, an IP communication apparatus (IP telephone and the like) connected to a LAN (Local Area Network) at office or home is generally connected to a WAN (Wide-Area Network) via a predetermined relay apparatus (router and the like). There is a relay apparatus installed with a NAT function for transparently performing conversion between a private IP address, which is valid only on a LAN, and a global IP address, which allows access to an external WAN. Such a relay apparatus has advantages, including increased flexibility in providing IP addresses to apparatuses connected to the LAN and improved security on the LAN.

However, to access an IP telephone service using such an IP communication apparatus connected to the WAN via the relay apparatus that has the NAT function, for example, SIP (Session Initiation Protocol) or the like, which is used as a call control protocol, adds a private IP address and port number to a data portion of an IP packet for communication. Thus, the NAT function, which converts only an IP address in a header portion of an IP packet, cannot convert the IP address in the data portion. In addition, even when adding a global IP address to the data portion of the IP packet, the IP communication apparatus has a problem where the apparatus cannot recognize the global address and port number information. As a result, a problem has arisen where the relay apparatus blocks delivery of a communication packet from the WAN side to the LAN side, which is a commonly-called NAT traversal problem.

To address such problems, methods are known that use protocols, including UPnP (Universal Plug and Play) and STUN (Simple Traversal of User Datagram Protocol). In the UPnP method, for instance, an IP communication apparatus that has a UPnP function is capable of obtaining information, including a global IP address, port number and the like, from a relay apparatus that supports UPnP IGD (Internet Gateway Device). The method is, however, based on the premise that the IP communication apparatus, relay apparatus, and the like support UPnP. Thus, the method is difficult to be applied to an apparatus and the like that do not have the UPnP function. Further, when a plurality of relay apparatuses exist, even provided with the UPnP function, it is not easy to grasp locations of all the relay apparatuses, and it is thus difficult to obtain necessary information, such as global IP addresses, port numbers, and the like. In the STUN method, meanwhile, a STUN server can be installed so as to provide necessary information (a global IP address, port number, NAT type, and the like) in response to a request from an IP communication apparatus on a network. Thereby, the method can be applied regardless of availability of the UPnP function. Even the STUN method, however, has a certain limit depending on an applied environment.

Conventional technology to achieve NAT traversal using UPnP and STUN is known in an information communication system, for example, where a plurality of terminal apparatuses are connected to different routers and perform P2P (Peer to Peer) communication over the Internet. When a connected router has the UPnP function, the terminal apparatus obtains a global IP address and port number based on a UPnP protocol, and registers the obtained information with an information controller on the Internet as exchange information. When a connected router has no UPnP function, on the other hand, the terminal apparatus obtains a global IP address and port number based on a STUN protocol, and registers the obtained information with the information controller as exchange information. For communication between the terminal apparatuses, the apparatuses mutually obtain the exchange information of the apparatuses to communicate with and achieves NAT traversing communication using the obtained exchange information (see Related Art 1).

[Related Art 1] Japanese Patent Laid-open Publication No. 2005-151142

The above-described NAT is categorized into four types according to its operational behavior: full cone, restricted cone, port restricted cone, and symmetric. Symmetric NAT herein correlates a private IP address and port number of a source terminal with a plurality of pairs of a global IP address and port number for different addresses of destination external apparatuses. With the conventional technology described in Related Art 1, therefore, when at least one terminal apparatus employs symmetric NAT, a global IP address and port number obtained based on the STUN protocol are different by destination. Thus, it is difficult to ensure NAT traversal with the technology as it fails to properly determine the port number, unless the NAT correlation method is known in advance or other special arrangements are made.

SUMMARY OF THE INVENTION

The present invention is provided to address the above-described problems in the conventional technology. A main object of the present invention is to provide an IP communication apparatus and an IP communication method of such an apparatus and system, so as to improve a feasible range of NAT traversal in a simple and secure manner with respect to a combination of NAT types of relay apparatuses, in communication with a destination apparatus via relay apparatuses that have a NAT function.

An IP communication according to the present invention performs communication on a network with a destination apparatus via a relay apparatus that has NAT function and comprises a signaling unit, a data communicator and a communication manager. The signaling unit transmits and receives a predetermined signal via a server in order to establish a connection with the destination apparatus. The data communicator receives a first media data from the destination apparatus and transmits a second media data to the destination apparatus after the connection is established. The communication manager obtains the source port number from the first media data received by the data communicator after the communication is established and sets the obtained source port number as a destination port number of the second media data.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 2 is a pattern diagram illustrating NAT type combination patterns between terminal apparatuses;

FIG. 5 illustrates exemplary data of terminal apparatuses A to H registered with the SIP server;

FIG. 15 illustrates NAT traversal methods for NAT type combinations.

DETAILED DESCRIPTION OF PREFERRED EMBODIMENTS

Figure 1:
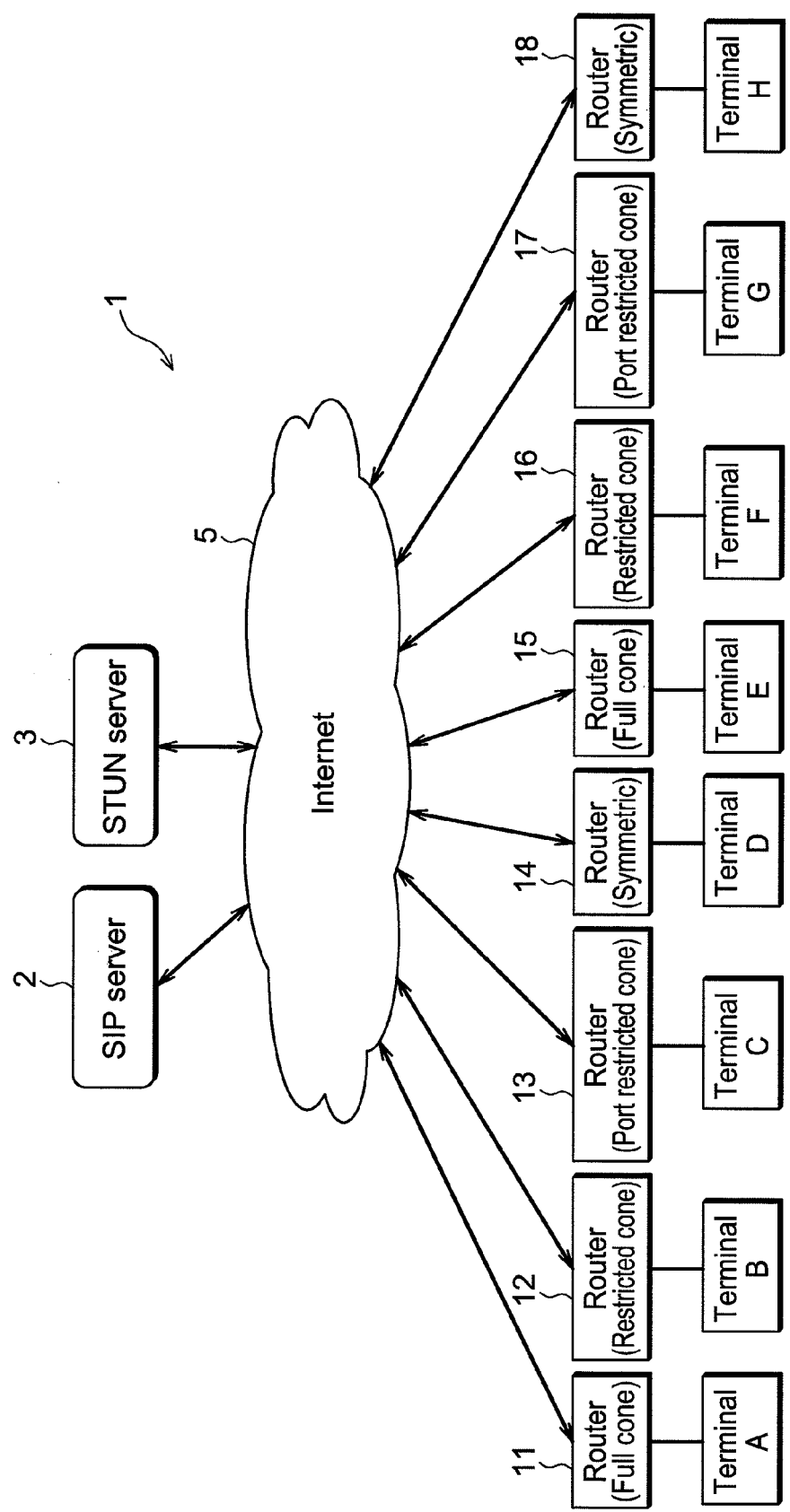
FIG. 1 illustrates a general configuration of an IP communication system according to the present invention.

A first aspect of the present invention provides an IP communication apparatus that performs communication on a wide-area network with a destination apparatus via a relay apparatus that has a NAT function. The IP communication apparatus has a signaling unit, a data communicator, and a communication manager. The signaling unit transmits and receives a call control message via a call connection server in order to establish a connection with the destination apparatus. The data communicator transmits and receives media data to and from the destination apparatus after the connection was established. The communication manager obtains the source port number information #SrcR1 on the latest media data packet received and replaces the destination port number information #DstS1 on the transmitting packet to #SrcR1 once the connection is established.

The above-described apparatus improves a feasible range of NAT traversal in a simple and secure manner with respect to a combination of NAT types of relay apparatuses, in communication with a destination apparatus via relay apparatuses that have a NAT function, even when at least one relay apparatus employs symmetric NAT, for example.

Particularly, even when a symmetric NAT relay apparatus, to which either of the IP communication apparatus or destination apparatus is connected, is combined with a relay apparatus that employs full cone NAT or restricted cone NAT, no exclusive relay server (session border controller and the like) is required for NAT traversal in media data communication. Thus, the structure has an advantage that reduces process on the exclusive relay server, which has a relatively high processing load and requires a high installation cost.

A second aspect of the present invention provides a structure where the communication manager compares the source port number information #SrcR1 on the latest packet received with the destination port number information #DstS1 on the transmitting packet, and replaces the destination port number information to #SrcR1 only when #DstS1 and #SrcR1 are different.

The above-described structure changes the set value of the destination port number only when necessary, thus improving a feasible range of NAT traversal in a more simplified process.

A third aspect of the present invention provides a structure where the communication manager changes the set value of the destination port number only for an initial packet that the data communicator has received from the destination apparatus after the connection was established.

The above-described structure minimizes the possibility of receiving an improper packet as a proper packet and inadvertently changing the port number, thus increasing the security. In this case, only when a source IP address of the first received packet is equal to a set value of a destination IP address that the data communicator transmits to the destination apparatus, the set value of the destination port number is changed. Thereby, the security further increases.

A fourth aspect of the present invention provides a structure where the communication manager controls the data communicator to transmit a dummy packet, so as to keep a predetermined port number for receiving a packet from the destination apparatus.

In the above-described structure, transmitting the dummy packet prevents deletion of an entry (port number and the like) registered on a NAT conversion table, thus ensuring receipt of a packet from the destination apparatus. The port number information for receiving a packet from the destination apparatus can be obtained through communication with a STUN server connected to the wide-area network, for example, before the signaling unit starts transmitting a call control message, or after the signaling unit receives a call control message. Thereby, the latest and proper port number information can be obtained.

In this case, the communication manager can continuously execute transmission of the dummy packet from the data communicator, until the communication with the destination apparatus ends. Thus, the IP communication apparatus can ensure receipt of a packet from the destination apparatus, not only when establishing a connection with the destination apparatus, but also when exchanging media data with the destination apparatus.

A fifth aspect of the present invention further provides a NAT information obtainer that communicates with a server for providing address information connected to the wide-area network, and obtains NAT type information of the relay apparatus to which the IP communication apparatus is connected. When the relay apparatus employs symmetric NAT, the communication manager does not execute transmission of the dummy packet.

The above-described structure prevents unnecessary dummy packet transmission, and thus ensures receipt of a packet from the destination apparatus in a more simplified process.

A sixth aspect of the present invention provides an IP communication apparatus that performs communication on a wide-area network with a destination apparatus via a relay apparatus that has a NAT function. The IP communication apparatus has a transmitter, a receiver, a data communicator, and a changer. The transmitter transmits to the destination apparatus, a global address and port number of the IP communication apparatus obtained in advance. The receiver receives from the destination apparatus, a response that includes a global address and port number of the destination address. The data communicator starts transmitting media data to the received port number of the destination apparatus, and starts receiving media data from the destination apparatus. When the port number of the destination apparatus, to which the media data transmission has started, is different from a source port number of a media data packet received from the destination apparatus, the changer changes the source port number to the destination port number of the media data. An IP communication apparatus that performs communication via a relay apparatus equipped with a NAT function, with a destination apparatus via the replay apparatus with a NAT function on the wide-area network. The IP communication apparatus has a transmitter, a receiver, a data communicator and a charger. The transmitter transmits to the destination apparatus, a global address and a waiting port number information of the IP communication apparatus obtained in advance. The receiver receives from the destination apparatus, a response that includes the global address and the port number information #SrcR2 of the destination address. The data communicator starts transmitting media data to the received port number #SrcR2 of the destination apparatus and starts receiving media data from the destination apparatus. The changer obtains source port number information #SrcR1 of the latest media data packet received and replaces the destination port number information #SrcR2 on the transmitting packet to #SrcR1, when #SrcR1 and #SrcR2 are different.

A seventh aspect of the present invention provides an IP communication system that includes a plurality of IP communication apparatuses that perform communication on a wide-area network via relay apparatuses that have a NAT function. Each of the IP communication apparatuses has a signaling unit, a data communicator, and a communication manager. The signaling unit transmits and receives a call control message via a call connection server in order to establish a connection with another IP communication apparatus. The data communicator transmits and receives media data to and from the another IP communication apparatus after the connection was established. The communication manager obtains source port number information of a media data packet that the data communicator has received after the communication was established; and changes a set value of a destination port number of a packet that the data communicator transmits to the another IP communication apparatus, such that the set value is equal to a value of the source port number.

An eighth aspect of the present invention provides an IP communication method of an IP communication apparatus that performs communication on a wide-area network with a destination apparatus via a relay apparatus that has a NAT function. The method includes signaling that transmits and receives a call control message via a call connection server in order to establish a connection with the destination apparatus; and data communication that transmits and receives media data to and from the destination apparatus after the connection was established. The data communication includes communication management that obtains source port number information of a received media data packet, and that changes a set value of a destination port number of a packet to be transmitted to the destination apparatus, such that the set value is equal to a value of the source port number.

The embodiment of the present invention are explained in the following, in reference to the above-described drawings.

FIG. 1 illustrates a general configuration of the IP communication system according to the embodiment of the present invention. IP communication system 1 includes a plurality of terminal apparatuses (IP communication apparatuses) A to H, SIP server (call connection server) 2, and STUN server (server for providing address information) 3, which are connected so as to communicate via Internet 5 as a wide-area network.

Terminal apparatuses A to H have an IP communication function, which exchanges audio and visual data and the like (hereinafter referred to as "media data") over Internet 5. The terminal apparatuses belong to different LANs (not shown in the figure) and connect to Internet 5 via respective routers (relay apparatuses) 11 to 18. Terminal apparatuses A to H function as a SIP client.

In detailed explanations below on functions and operations of terminal apparatuses A to H in the present embodiment, terminal apparatuses A to H are handled as an IP telephone apparatus that supports SIP. Terminal apparatuses A to H are not limited to such an IP telephone apparatus, but a desired terminal apparatus having an IP communication function may be used. For explanation purposes, it is understood in the embodiment that terminal apparatuses A to D initiate a call and that terminal apparatuses E to H receive a call, which are non-limiting.

Routers 11 to 18 are broadband routers, which have a NAT function for transparently performing conversion between a private IP address (hereinafter referred to as "private address") and a global IP address (hereinafter referred to as "global address"). The private address is used in communication of terminal apparatuses A to H on respective LANs. The global address is used in communication via Internet 5 outside of the LANs. The NAT function of routers 11 to 18 permits outbound communication, which is initiated from the inside of NAT toward the outside thereof; and basically rejects inbound communication, which is initiated from the outside of NAT toward the inside thereof. Further, the NAT function deletes an entry (registered information) on a NAT conversion table according to such as time elapsed and the like, and thereby provides a firewall function. The term "NAT" used herein is not limited to a technology that performs conversion between private addresses and global addresses, but further includes related technologies, including NAPT (Network Address Port Translation), which converts port numbers in addition to IP addresses, and the like.

The NAT function of routers 11 to 18 falls into one of the four NAT types. Routers 11 and 15 employ full cone NAT; routers 12 and 16 employ restricted cone NAT; routers 13 and 17 employ port restricted cone NAT; routers 14 and 18 employ symmetric NAT. Thus, 16 combination patterns exist, as shown in FIG. 2, in communication among terminal apparatuses A to H. In the explanations below, alphabetical letters shown in FIG. 2 ("F-F" and the like) are used to indicate combinations of communication among terminal apparatuses A to H.

SIP server 2 transmits and receives a SIP message (call control message) to and from terminal apparatuses A to H so as to relay a connection among terminal apparatuses A to H. SIP server 2 has a proxy server function and a registrar function. The proxy server function relays location information, and a call initiation request and a response, in order to connect a call among terminal apparatuses A to H in response to a request therefrom. The registrar function manages (i.e., registers with, updates on, deletes from a predetermined database, and the like) global address information associated with terminal apparatuses A to H. The terminal apparatuses, whose connection is established through SIP server 2, can perform P2P (Peer to Peer) communication of media data in a media session. In the figure, all terminal apparatuses A to H are configured to access SIP server 2. The terminal apparatuses, however, may be configured to access different proxy servers for communication.

STUN server 3 has a function that notifies information, including a global address, port number, and the like, of terminal apparatuses A to H in response to a request therefrom. When receiving a binding request (UDP, or User Datagram Protocol, packet) from terminal apparatuses A to H, STUN server 3 extracts source address information of the binding request, and returns a binding response, to which the information is added. Thereby, terminal apparatuses A to H can recognize a global address and port number of routers to which the terminal apparatuses are connected. Terminal apparatuses A to H transmit a binding request to the STUN server on a trial basis in a known method based on the algorithm defined in RFC3489, and thereby determine a NAT type (full cone, restricted cone, port restricted cone, symmetric, or no NAT) of the connected routers.

Figure 3:
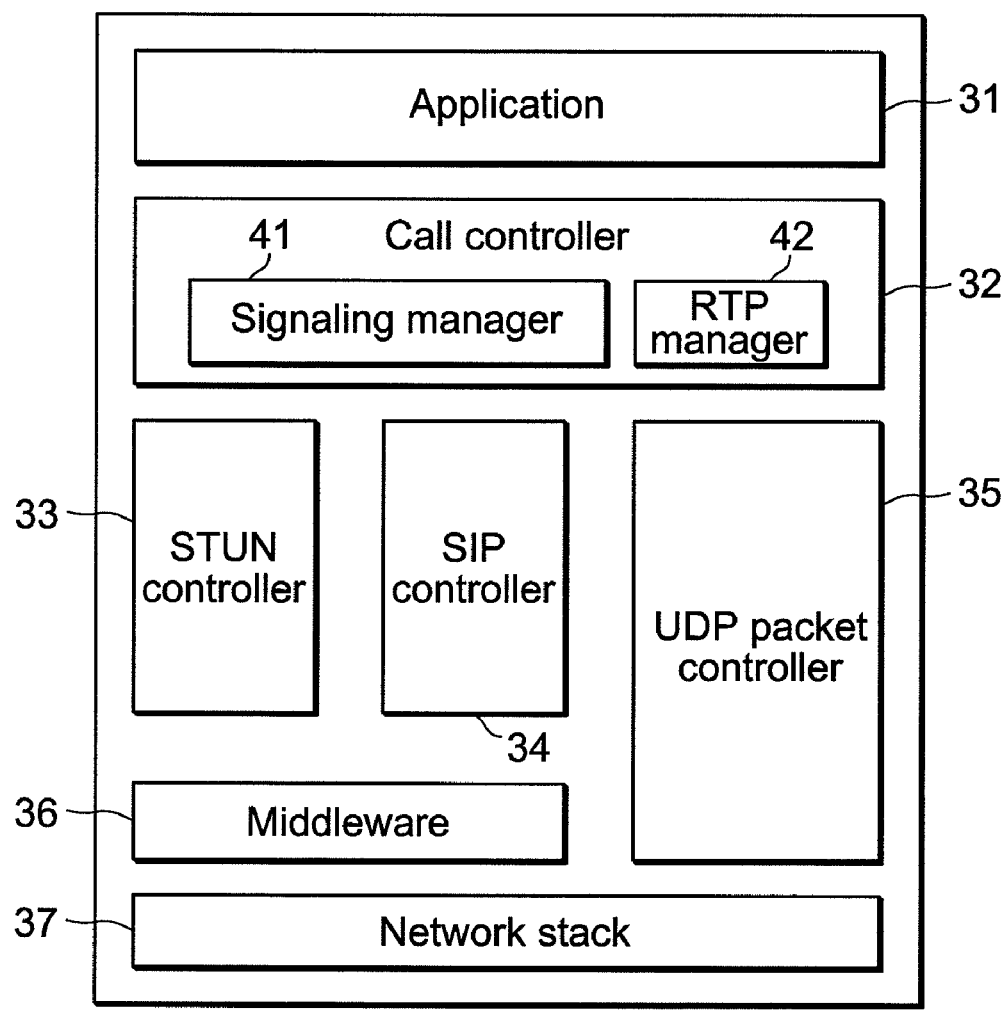
FIG. 3 is a block diagram illustrating a structure of a main portion of terminal apparatuses A to H.

FIG. 3 is a block diagram illustrating a structure of a main portion of terminal apparatuses A to H shown in FIG. 1. Each of terminal apparatuses A to H has application 31, call controller 32, STUN controller 33, SIP controller 34, UDP packet controller 35, middleware 36, and network stack 37. Although the figure shows the main structure related to the present invention, each of terminal apparatuses A to H is provided with a known structure for functioning as an IP telephone apparatus, for instance, in addition to the structure shown in FIG. 3.

Application 31 executes a variety of functions (functions to operate as an IP telephone apparatus herein) provided by the terminal apparatus according to user's operations.

Call controller 32 has signaling manager 41 and RTP manager 42, which manage operations of SIP controller 34, STUN controller 33, and UDP packet controller 35. Signaling manager 41 mainly manages signaling operations of SIP controller 34 and information obtaining operations of STUN controller 33. RTP manager 42 mainly manages packet communication operations of UDP packet controller 35.

STUN controller 33, which executes processes related to NAT traversal based on a STUN protocol through communication with STUN server 3, obtains address and NAT type information for NAT traversal. SIP controller 34, which executes signaling processes based on a SIP protocol through communication with SIP server 2, performs call connection by providing a communication channel with a destination apparatus (terminal apparatus to communicate with) when starting communication with the destination apparatus. UDP packet controller 35, which executes communication processes based on UDP or RTP (Real-time Transport Protocol), generates, transmits, and receives a UDP packet and an RTP packet, which is packetized media data (call voice herein).

Middleware 36 executes processes related to DHCP (Dynamic Host Configuration Protocol) and DNS (Domain Name System) for obtaining information necessary for the terminal apparatus to connect to the network.

Network stack 37 controls a network adapter for connecting to the LAN, and allows communication via Internet 5 based on a predetermined protocol.

The functions of each component shown in FIG. 3 can be provided, as a CPU (Central Processing Unit, not shown in the figure) executes processes based on predetermined control programs, for example.

Figure 4:
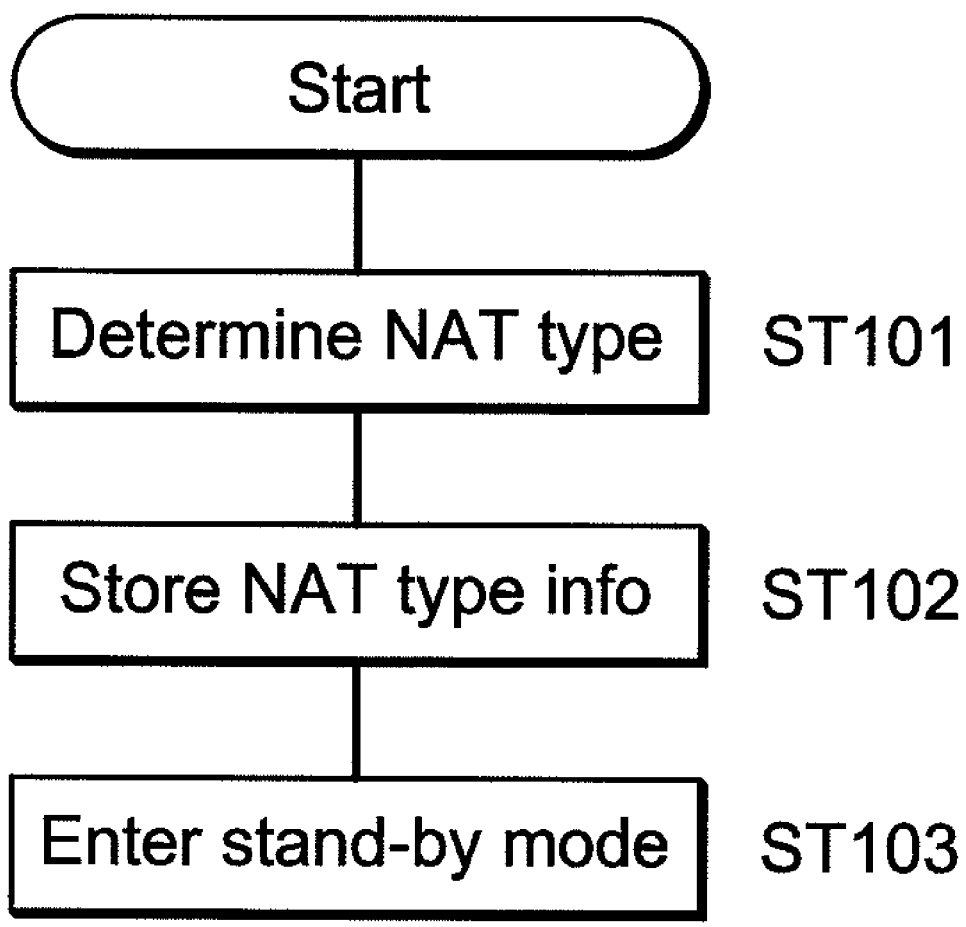
FIG. 4 is a flowchart illustrating a process for registering terminal apparatuses A to H with a SIP server.

FIG. 4 is a flowchart illustrating a flow for storing NAT types of terminal apparatuses A to H. When the terminal apparatus starts, signaling controller (NAT information obtainer) 41 first transmits a binding request to the STUN server on a trial basis in a known method, and determines a NAT type of a router to which the terminal apparatus is connected (ST 101).

Then, the terminal apparatus stores the obtained NAT type information in an internal memory thereof or in an apparatus and the like on the network (ST 102). Thereafter, the terminal apparatus enters stand-by mode (ST 103), and repeats above-described ST 101 and ST 102 at a predetermined time interval (e.g., every 10 minutes). The NAT type information can be stored along with IDs of terminal apparatuses A to H and associated telephone numbers, as shown in FIG. 5.

Figure 6:
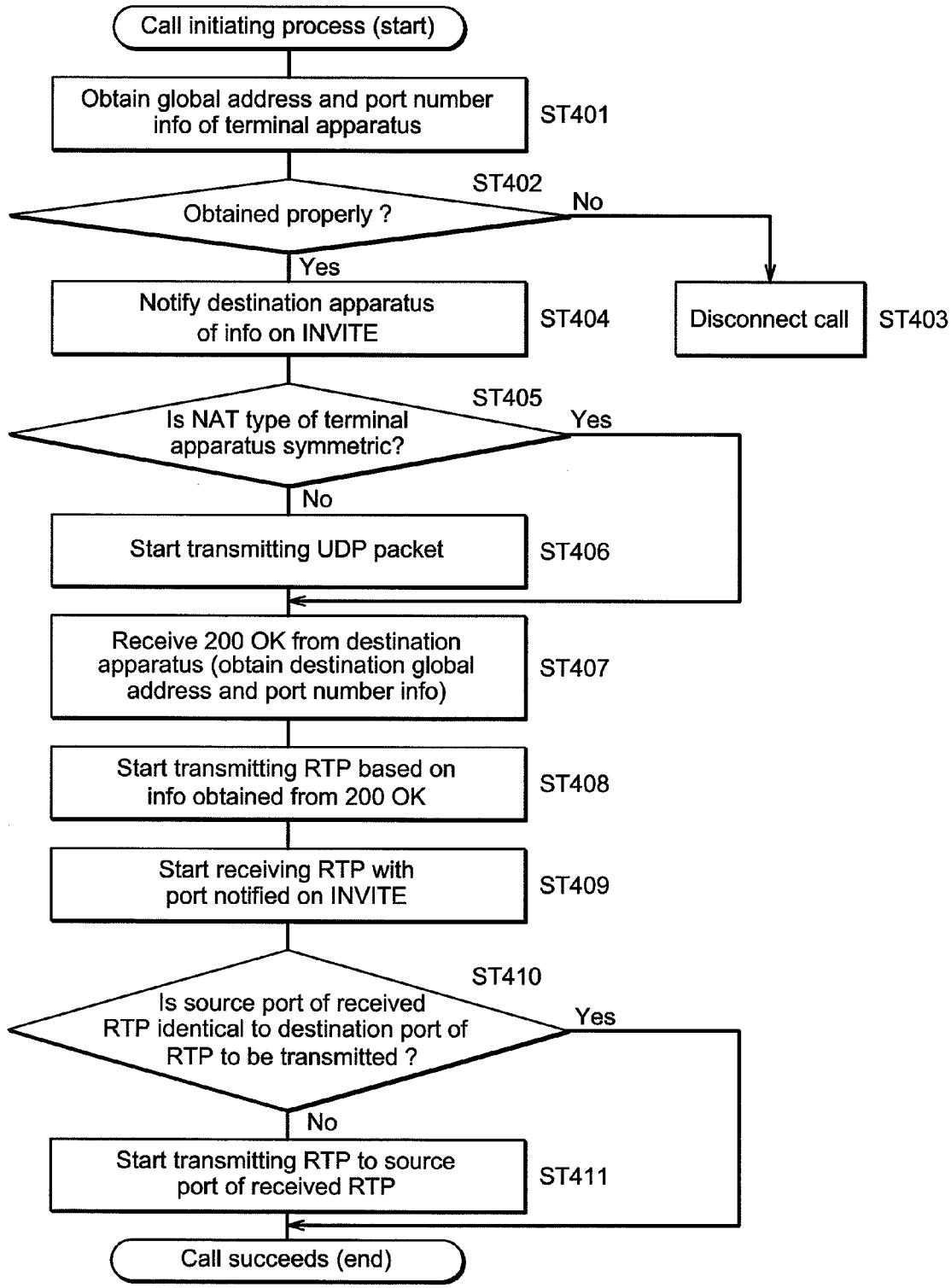
FIG. 6 is a flowchart illustrating a process for initiating a call on terminal apparatuses A to H.

FIG. 6 is a flowchart illustrating a process flow for initiating a call on terminal apparatuses A to H shown in FIG. 1. Signaling manager 41 of the terminal apparatus first transmits a binding request to STUN server 3. Based on a binding response from STUN server 3 to the request, signaling manager 41 obtains and stores in the memory thereof, global address and port number information of a router to be used for communication (ST 401). Then, signaling manager 41 determines whether or not the global address and port number information was properly obtained (ST 402). When the information was not properly obtained, signaling manager 41 disconnects the call based on a decision that SIP server 2 or the terminal apparatus has a problem (ST 403). On the other hand, when the information was properly obtained, signaling manager 41 transmits an INVITE request, to which the global address and port number information is added, to a destination apparatus through SIP server 2 (ST 404).

When a previously investigated NAT type of the terminal apparatus is not symmetric NAT (ST 405: No), RTP manager 42 of the terminal apparatus starts transmitting a UDP packet (dummy packet) from UDP packet controller 35 to SIP server 2 (ST 406), in order to keep the port number (i.e., an entry on a NAT conversion table) to which the binding request was transmitted in ST 401. Transmission of the UDP packet is continuously executed at a predetermined time interval. When the NAT type of the terminal apparatus is symmetric NAT, transmission of the UDP packet is unnecessary, and thus ST 406 is not executed. Subsequently, the terminal apparatus receives a 200 OK message from the destination apparatus. The terminal apparatus then stores in the memory thereof, global address and port number information of the destination apparatus, which is added to the 200 OK message, and sets the information as destination address information of the destination apparatus (ST 407).

When the connection is established with the destination apparatus through the processes above, RTP manager 42 starts transmitting media data (an RTP packet) to the global address and port number of the destination apparatus obtained in ST 407 (ST 408). Further, RTP manager 42 starts receiving media data using the port number communicated to the destination apparatus in the INVITE request in ST 404 (ST 409). When receiving the RTP packet from the destination apparatus, RTP manager 42 determines whether or not source port number information of the RTP packet is identical to the set value of the destination port number of the RTP packet that the terminal apparatus transmits to the destination apparatus (ST 410). When the port numbers are identical, RTP manager 42 continues transmitting the RTP packet to the port number of the destination apparatus obtained in ST 407. On the other hand, when the port numbers are different, RTP manager 42 changes the set value of the destination port number based on the address information obtained in ST 407, to the source port number of the RTP packet newly received from the destination apparatus, and then starts transmitting the RTP packet (ST 411). When the call is successfully made thereby, the terminal apparatus ends the call initiating process.

Determining in ST 410 whether or not the source global address of the RTP packet is identical to the destination global address, to which the RTP packet is transmitted from the terminal apparatus for the destination apparatus, identifies the source of the RTP packet, and thus further increases the security. Further in ST 410, determining the port number based only on the RTP packet received first after receiving the 200 OK message from the destination apparatus in ST 407 (i.e., after establishing the connection with the destination apparatus), minimizes the possibility of receiving an improper packet as a proper packet and inadvertently changing the port number, and thus improving the security.

Figure 7:
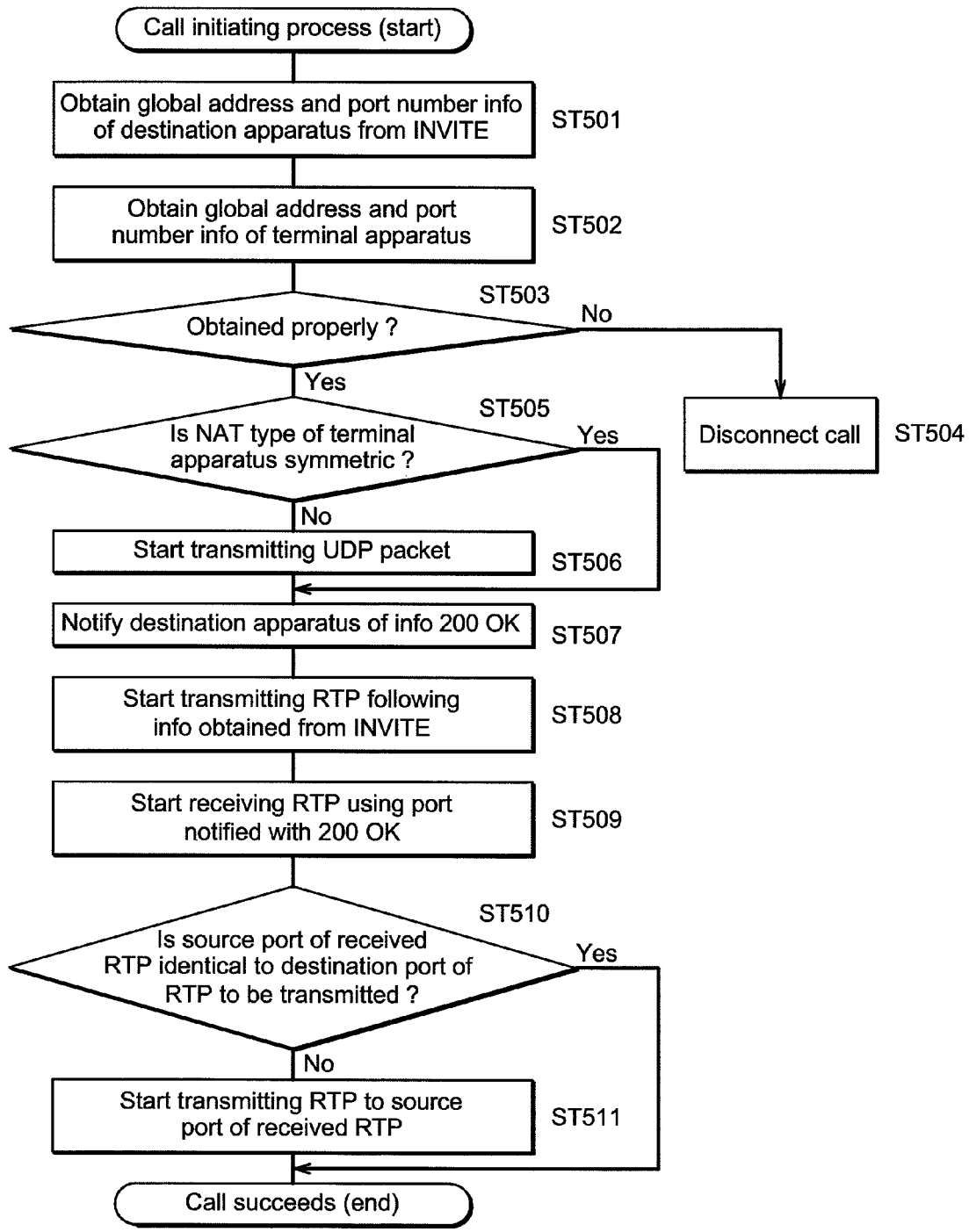
FIG. 7 is a flowchart illustrating a process for receiving a call on terminal apparatuses A to H.

FIG. 7 is a flowchart illustrating a process flow for receiving a call on terminal apparatuses A to H shown in FIG. 1. Signaling controller 41 of the terminal apparatus first receives an INVITE request from a destination apparatus via SIP server 2, and obtains global address and port number information added in the message (ST 501). The terminal apparatus sets the obtained global address and port number as destination address information of the destination address. Subsequently, signaling controller 41 transmits a binding request to STUN server 3. Based on a binding response from STUN server 3 to the request, the terminal apparatus obtains global address and port number information of a router that the terminal apparatus uses for communication (ST 502). Then, signaling manager 41 determines whether or not the global address and port number information was properly obtained (ST 503). When the information was not properly obtained, signaling manager 41 disconnects the call based on a decision that SIP server 2 or the terminal apparatus has a problem (ST 504). On the other hand, when the information was properly obtained, the process proceeds to a next step.

When a previously investigated NAT type of the terminal apparatus is not symmetric NAT (ST 505: No), RTP manager 42 of the terminal apparatus starts transmitting a UDP packet to the destination apparatus from which the INVITE request was received in ST 501 (ST 506), in order to keep the port number to which the binding request was transmitted in ST 502. When the NAT type of the terminal apparatus is symmetric NAT, transmission of the UDP packet is unnecessary, and thus ST 506 is not executed. Further, signaling controller 41 transmits to the destination apparatus a 200 OK message that includes the global address and port number information of the terminal apparatus obtained in ST 502 (ST 507).

When the connection is established with the destination apparatus through the processes above, RTP manager 42 starts transmitting media data (an RTP packet) to the global address and port number of the destination apparatus obtained in ST 501 (ST 508). Further, RTP manager 42 starts receiving media data using the port number communicated to the destination apparatus in the 200 OK message in ST 507 (ST 509). When receiving the RTP packet from the destination apparatus, RTP manager 42 determines whether or not source port number information of the RTP packet is identical to the set value of the destination port number of the RTP packet that the terminal apparatus transmits to the destination apparatus (ST 510). When the port numbers are identical, RTP manager 42 continues transmitting the RTP packet to the port number of the destination apparatus obtained in ST 501. On the other hand, when the port numbers are different, RTP manager 42 changes the set value of the destination port number based on the address information obtained in ST 501, to the source port number of the RTP packet newly received from the destination apparatus, and then starts transmitting the RTP packet (ST 511). When the call is successfully made thereby, the terminal apparatus ends the call receiving process.

Determining in ST 510 whether or not the source global address of the RTP packet is identical to the destination global address, to which the RTP packet is transmitted from the terminal apparatus for the destination apparatus, identifies the source of the RTP packet and thus further increases the security. Further in ST 510, determining the port number based only on the RTP packet received first after receiving the 200 OK message from the destination apparatus in ST 507 (i.e., after establishing the connection with the destination apparatus), minimizes the possibility of receiving an improper packet as a proper packet and inadvertently changing the port number, and thus improving the security.

Figure 8:
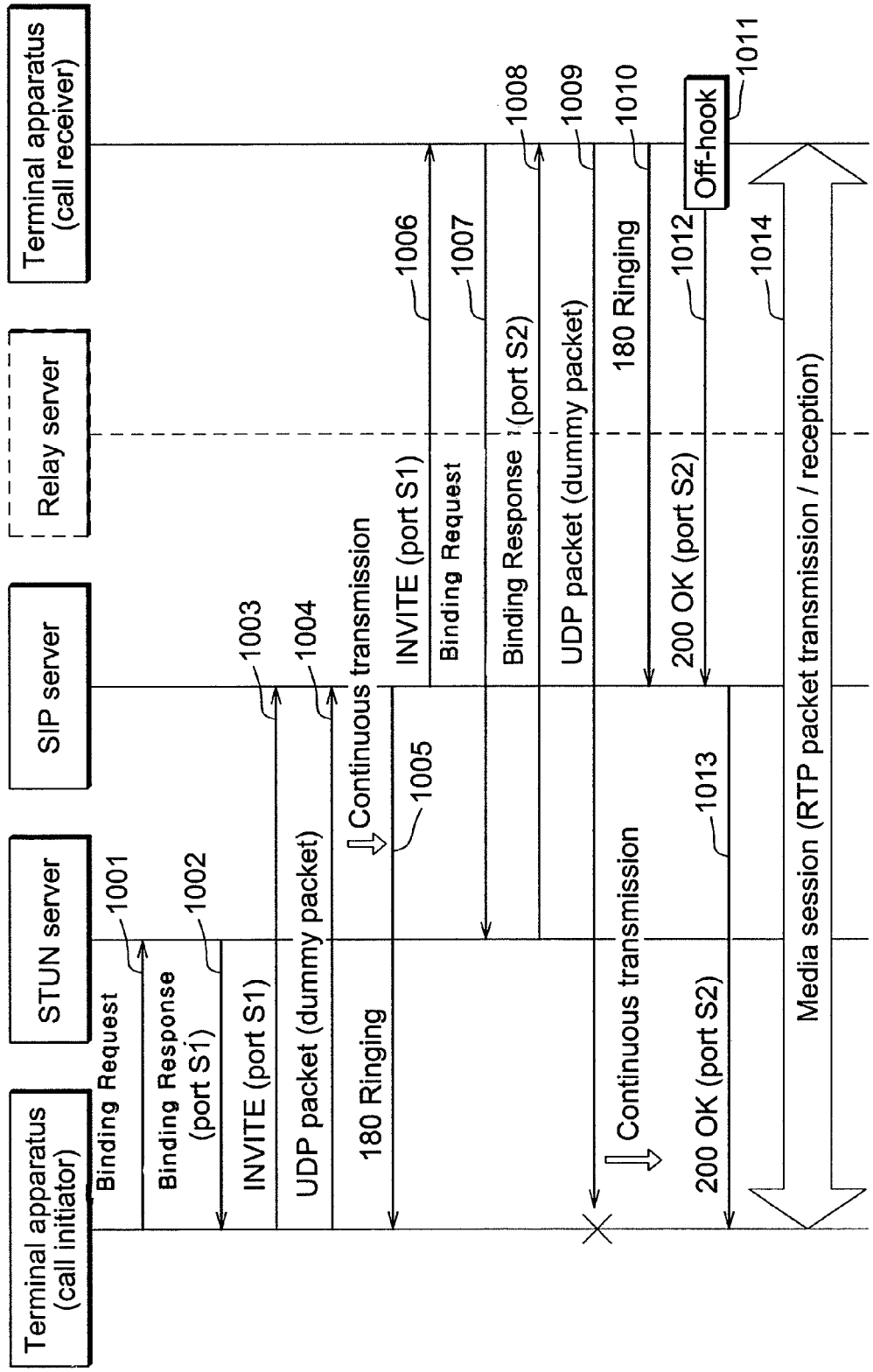
FIG. 8 illustrates a sequence of an exemplary communication process executed in an IP communication system.

FIG. 8 illustrates a sequence of an exemplary communication process executed in the IP communication system shown in FIG. 1. The figure mainly shows the communication process executed irrelevant to NAT type combinations of the terminal apparatuses. Details on communication processes executed according to the NAT type combinations will be described with reference to FIGS. 9 to 14.

First, a terminal apparatus that initiates a call transmits a binding request to STUN server 3 (1001). When receiving the request, STUN server 3 transmits to the terminal apparatus a binding response, to which information of source global address and port number S1 in the binding request is added (1002). Then, the call-initiating terminal apparatus transmits to SIP server 2 an INVITE request, to which the information of global address and port number S1 thereof is added (1003). Subsequently, the terminal apparatus starts transmitting a UDP packet (dummy packet) to SIP server 2, in order to keep port number S1, to which the binding request was transmitted (1004). Transmission of the UDP packet is continuously executed at a predetermined time interval (e.g., every 30 seconds) until the communication ends.

When receiving the INVITE request from the call-initiating terminal apparatus, SIP server 2 transmits to the terminal apparatus, a 180 ringing message, which notifies that an apparatus is ringing (1005), and forwards the received INVITE request to the terminal apparatus that receives a call (1006).

When receiving the INVITE request, the call-receiving terminal apparatus transmits a binding request to STUN server 3, similar to the call-initiating terminal apparatus (1007). Based on a binding response from STUN server 3, the terminal apparatus obtains information of global address and port number S2 thereof (1008). Subsequently, the call-receiving terminal apparatus starts transmitting a UDP packet (dummy packet) to a source IP port designated in the INVITE message, in order to keep port number S2, to which the binding request was transmitted (1009). When the call-initiating terminal apparatus employs port restricted cone NAT, the UDP packet (dummy packet) in step 1009 is discarded, but transmission of the dummy packet keeps port number S2 of the call-receiving terminal apparatus. Then, when ready to ring, the call-receiving terminal apparatus transmits to SIP server 2, a 180 ringing message, which notifies that the apparatus is ringing (1010).

Subsequently, when detecting an off-hook operation by a user (1011), the call-receiving terminal apparatus transmits to SIP server 2, a 200 OK message, which notifies that the user has answered (1012). When receiving the 200 OK message, SIP server 2 transmits the message to the call-initiating terminal apparatus (1013). The 200 OK message additionally includes the information of global address and port number S2 of the call-receiving terminal apparatus obtained from STUN server 3 in step 1008. When the call-receiving terminal apparatus employs symmetric NAT, however, the global address and port number added herein are different from the values obtained from STUN server 3 in step 1008.

When the connection is established between the terminal apparatuses through the communications above, the terminal apparatuses exchange media data (call voice herein) in form of an RTP packet in a media session (1014). Ending the session and the like after an on-hook operation are not explained.

FIGS. 9 to 14 illustrate sequences of detailed communication processes executed according to NAT type combinations. NAT traversal methods performed in media sessions of the communication processes are categorized into methods A and B. Method A employs a port keep-alive process, where a UDP packet is transmitted to SIP server 2 or a destination apparatus so as to keep a port number. Method B employs a port change process, where source port number information of an RTP packet transmitted from a destination apparatus is obtained; and a set value of a destination port number of an RTP packet transmitted to the destination apparatus is changed to a value identical to the source port number (including a case where the port keep-alive process is executed together). FIG. 15 shows a relationship between the NAT traversal methods and NAT type combinations.

Figure 9:
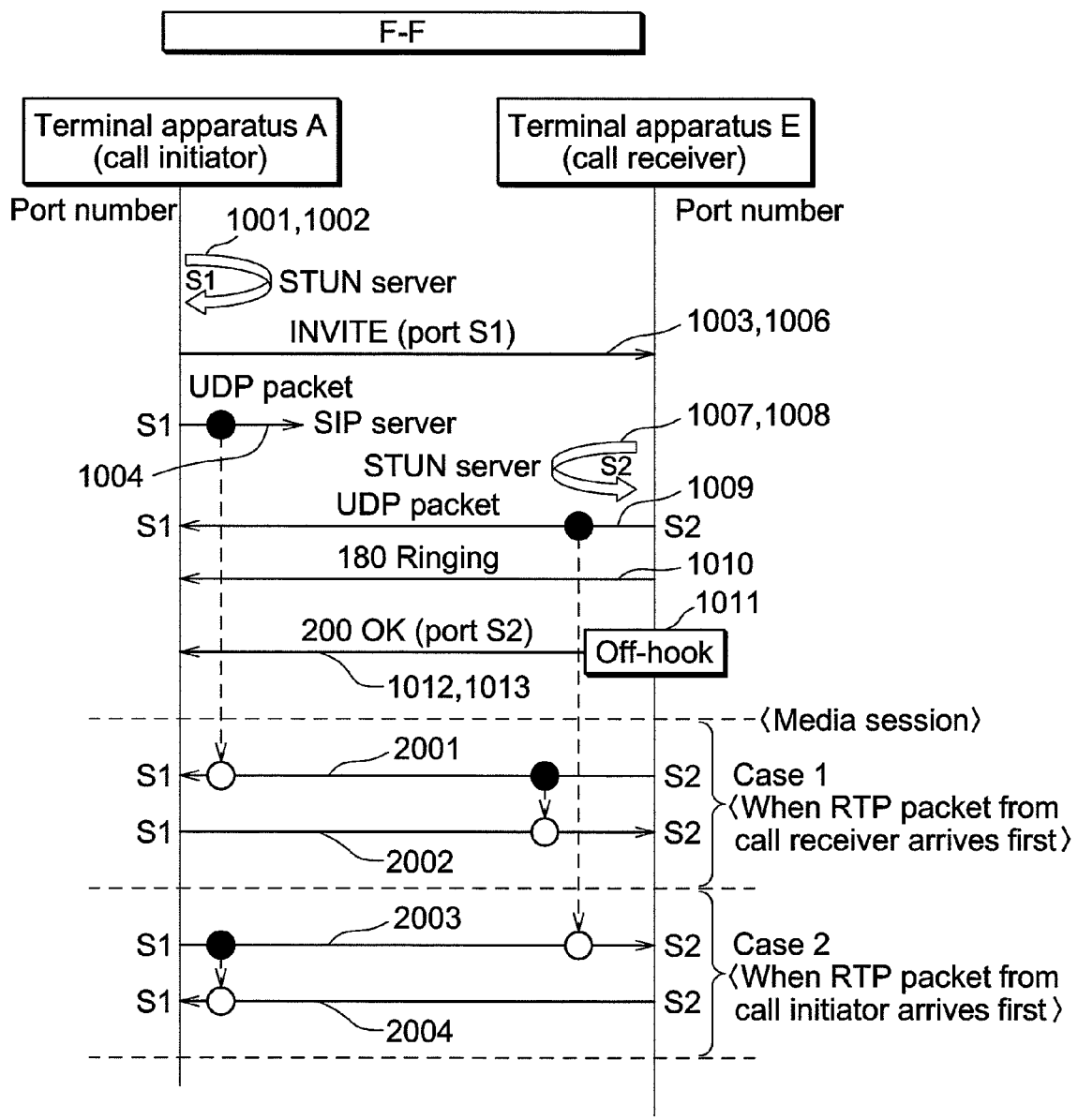
FIG. 9 illustrates a sequence of a communication process for a NAT type combination of F-F.
Figure 10:
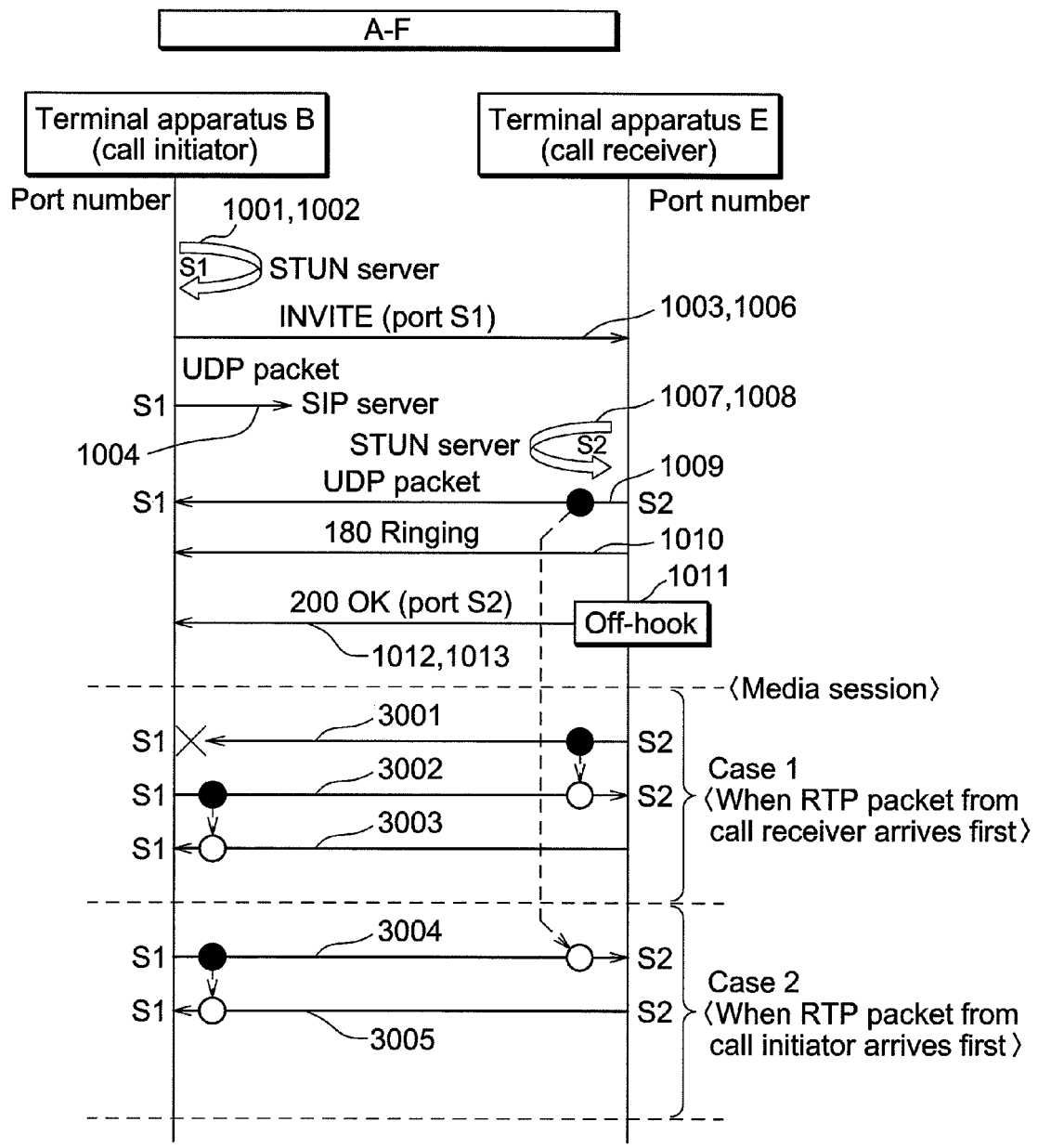
FIG. 10 illustrates a sequence of a communication process for a NAT type combination of A-F.
Figure 11:
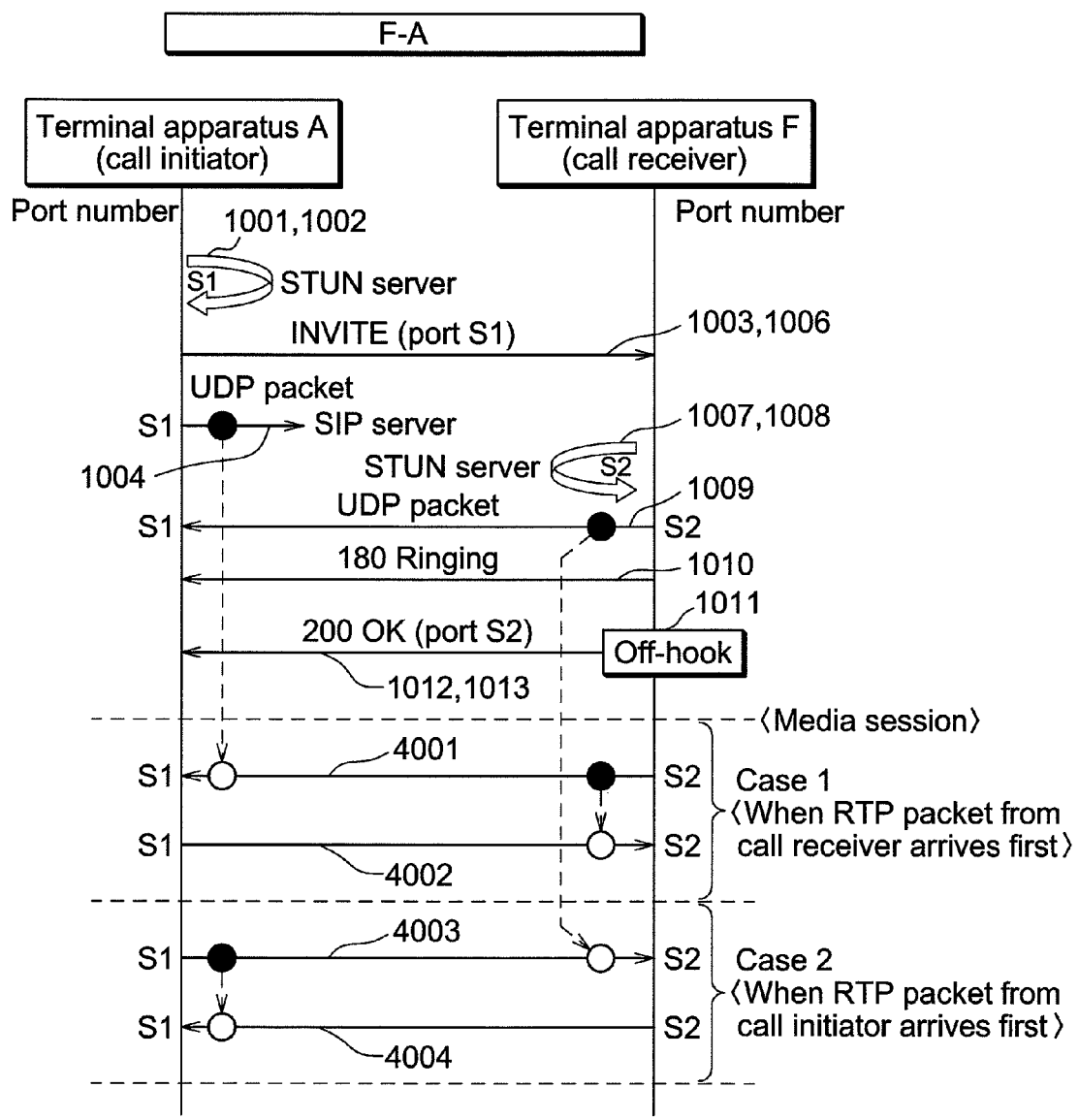
FIG. 11 illustrates a sequence of a communication process for a NAT type combination of F-A.

FIGS. 9 to 11 illustrate NAT types F-F, A-F, and F-A respectively, as exemplary communication processes that use NAT traversal method A. STUN server 3 and SIP server 2 are omitted from FIGS. 9 to 11 to simplify the explanation (the same applies to FIGS. 12 to 14). Further, processes substantially similar to the sequence in FIG. 8 are provided with the same numerical references in FIGS. 9 to 11. Unless otherwise described in particular below, descriptions are the same as those for FIG. 8 (the same applies to FIGS. 12 to 15).

In case of NAT type F-F as shown in FIG. 9, call-initiating terminal apparatus A obtains information of global address and port number S1 thereof through inquiry to STUN server 3 (1001 and 1002). Then, terminal apparatus A transmits to call-receiving terminal apparatus E, an INVITE request, to which the information of global address and port number S1 of terminal apparatus A is added (1003 and 1006). Subsequently, terminal apparatus A starts transmitting a UDP packet to SIP server 2, in order to keep port number S1 (1004). Transmission of the UDP packet is continuously executed at a predetermined time interval.

When receiving the INVITE request, terminal apparatus E obtains information of global address and port number S2 thereof through inquiry to STUN server 3 (1007 and 1008), similar to terminal apparatus A. Terminal apparatus E then starts transmitting a UDP packet to terminal apparatus A, in order to keep port number S2 (1009), similar to terminal apparatus A. Further, terminal apparatus E transmits to terminal apparatus A, a 180 ringing message, which notifies that the terminal apparatus is ringing (1010). When detecting an off-hook operation (1011), terminal apparatus E transmits to terminal apparatus A, a 200 OK message, which notifies that the user has answered (1012 and 1013). The 200 OK message additionally includes the information of global address and port number S2 of terminal apparatus E.

In a media session thereafter, there are two cases considered, where an RTP packet from call-receiving terminal apparatus E reaches the call-initiating side earlier (case 1), and, conversely, an RTP packet from call-initiating terminal apparatus A reaches the call-receiving side earlier (case 2). FIG. 9 shows the two cases separately. Further in the figure, a mark ● provided on a communication arrow and a mark ○ connected therefrom with a dotted arrow indicate that an outbound communication provided with the mark ● enables an inbound communication provided with the mark ○, including a case for preventing deletion of an existing entry on a NAT conversion table (the same applies to FIGS. 12 to 17). A mark X at the end of the communication arrow indicates that the communication does not reach the terminal apparatus to communicate with.

In case 1, terminal apparatus E transmits the RTP packet to port number S1 of terminal apparatus A, which was obtained in the preceding INVITE request (2001). In this case, terminal apparatus A employs full cone NAT; and the UDP packet, which terminal apparatus A continuously transmits, keeps port number S1. Thus, the RTP packet from terminal apparatus E reaches terminal apparatus A. Then, terminal apparatus A transmits the RTP packet to port number S2 of terminal apparatus E, which was obtained in the preceding 200 OK message (2002). In this case, terminal apparatus E employs full cone NAT, and immediately preceding communication 2001 from terminal apparatus E to terminal apparatus A (or the UDP packet that terminal apparatus E continuously transmits) keeps port number S2. Thus, the RTP packet from terminal apparatus A reaches terminal apparatus E. Normal communication can be performed thereafter.

In case 2, terminal apparatus A transmits the RTP packet to port number S2 of terminal apparatus E, which was notified in the preceding 200 OK message (2003). The UDP packet, which terminal apparatus E continuously transmits, keeps port number S2. Thus the RTP packet reaches terminal apparatus A. Then, terminal apparatus E transmits the RTP packet to port number S1 of terminal apparatus A, which was obtained in the preceding INVITE request (2004). Immediately preceding communication 2003 from terminal apparatus A to terminal apparatus E (or the UDP packet that terminal apparatus A continuously transmits) keeps port number S1, and thus the RTP packet from terminal apparatus E reaches terminal apparatus A. Normal communication can be performed thereafter.

In case of NAT type A-F as shown in FIG. 10, a connection is established between the terminal apparatuses, similar to FIG. 9 (1001 to 1011). In a media session thereafter, in case 1, call-receiving terminal apparatus E transmits an RTP packet to port number S1 of call-initiating terminal apparatus B, which was obtained in the preceding INVITE request (3001). In this case, a UDP packet, which terminal apparatus B continuously transmits, keeps port number S1. Since call-initiating terminal apparatus B employs restricted cone NAT (same for port restricted cone NAT), however, terminal apparatus B (router 12) rejects the RTP packet from terminal apparatus E due to IP address restriction.

Then, terminal apparatus B transmits an RTP packet to port number S2 of terminal apparatus E, which was obtained in the preceding 200 OK message (3002). In this case, terminal apparatus E employs full cone NAT; and immediately preceding communication 3001 from terminal apparatus E to terminal apparatus B (or the UDP packet that terminal apparatus E continuously transmits) keeps port number S2. Thus, the RTP packet from terminal apparatus B reaches terminal apparatus E. Subsequently, terminal apparatus E transmits the RTP packet to port number S1 of terminal apparatus B, which was obtained in the preceding INVITE request (3003). In this case, immediately preceding communication 3002 from terminal apparatus B to terminal apparatus E releases the IP address restriction. Thus, the RTP packet from terminal apparatus E reaches terminal apparatus B. Normal communication can be performed thereafter.

In case 2, terminal apparatus B transmits an RTP packet to port number S2 of terminal apparatus E, which was obtained in the preceding 200 OK message (3004). In this case, the UDP packet, which terminal apparatus E continuously transmits, keeps port number S2. Thus, the RTP packet from terminal apparatus B reaches terminal apparatus E. Then, terminal apparatus E transmits an RTP packet to port number S1 of terminal apparatus B, which was obtained in the preceding INVITE request (3005). In this case, immediately preceding communication 3004 from terminal apparatus B to terminal apparatus E keeps port number S1. Thus, the RTP packet from terminal apparatus E reaches terminal apparatus B. Normal communication can be performed thereafter.

In case of NAT type F-A as shown in FIG. 11, a connection is established between the terminal apparatuses, similar to FIG. 9 (1001 to 1011). In a media session thereafter, in case 1, call-receiving terminal apparatus F transmits an RTP packet to port number S1 of call-initiating terminal apparatus A, which was obtained in the preceding INVITE request (4001). In this case, call-initiating terminal apparatus A employs full cone NAT; and a UDP packet, which terminal apparatus A continuously transmits, keeps port number S1. Thus, the RTP packet reaches terminal apparatus A. Then, terminal apparatus A transmits an RTP packet to port number S2 of terminal apparatus F, which was obtained in the preceding 200 OK message (4002). In this case, although terminal apparatus F employs restricted cone NAT (same for port restricted cone NAT), the RTP packet from terminal apparatus A reaches terminal apparatus F, since immediately preceding communication 4001 from terminal apparatus F to terminal apparatus A releases IP address restriction to terminal apparatus A and keeps port number S2. Normal communication can be performed thereafter.

In case 2, terminal apparatus A transmits an RTP packet to port number S2 of terminal apparatus F, which was obtained in the preceding 200 OK message (4003). In this case, the UDP packet, which terminal apparatus F continuously transmits, keeps port number S2. Thus, the RTP packet from terminal apparatus A reaches terminal apparatus F. Then, terminal apparatus F transmits an RTP packet to port number S1 of terminal apparatus A, which was obtained in the preceding INVITE request (4004). In this case, immediately preceding communication 4003 from terminal apparatus A to terminal apparatus F releases IP address restriction to terminal apparatus F and keeps port number S1. Thus, the RTP packet from terminal apparatus F reaches terminal apparatus A. Normal communication can be performed thereafter.

In addition to above-described F-F, A-F, and F-A, the communications similar to above can be performed for NAT type combinations to which method A is applicable.

Figure 12:
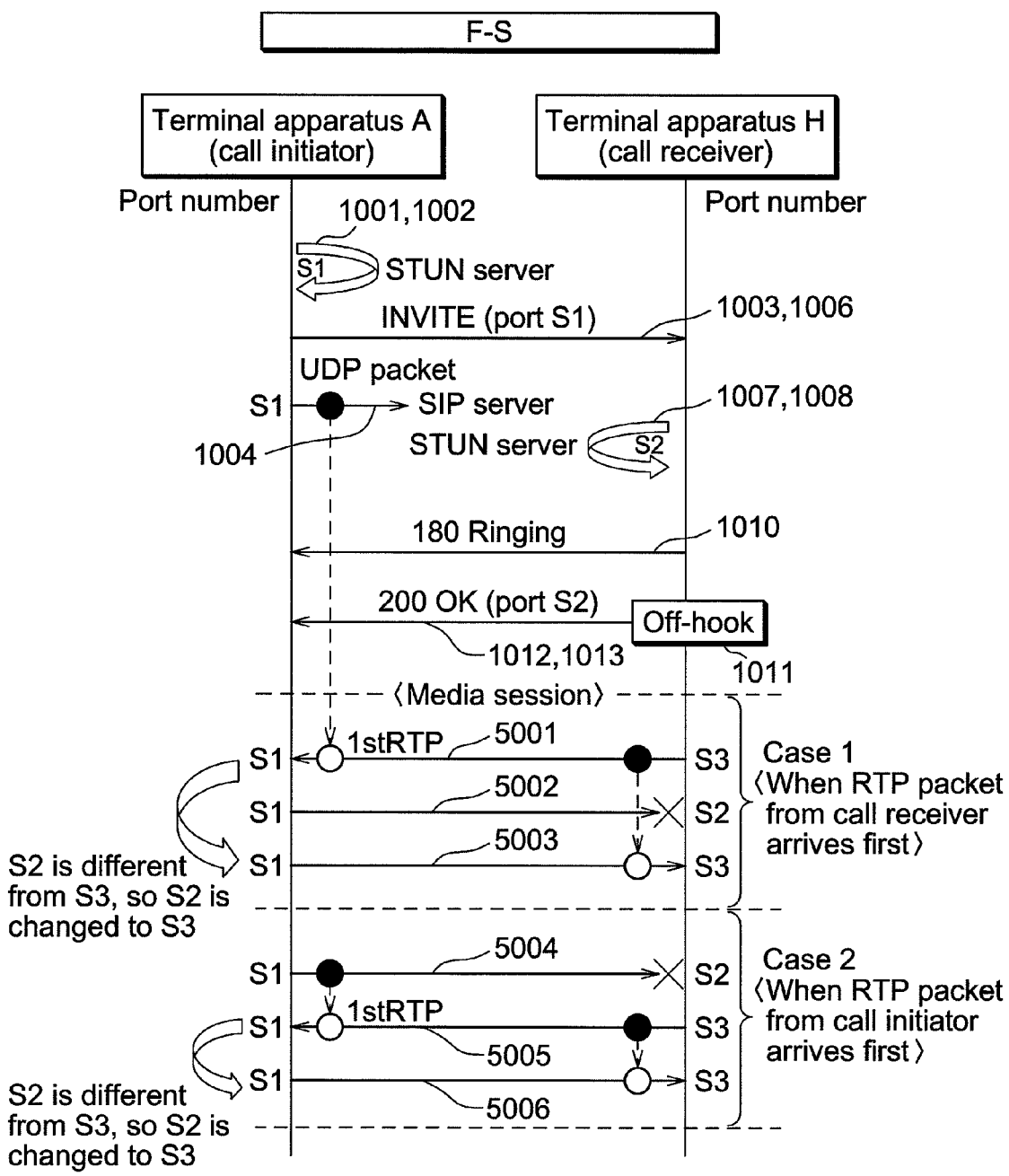
FIG. 12 illustrates a sequence of a communication process for a NAT type combination of F-S.
Figure 13:
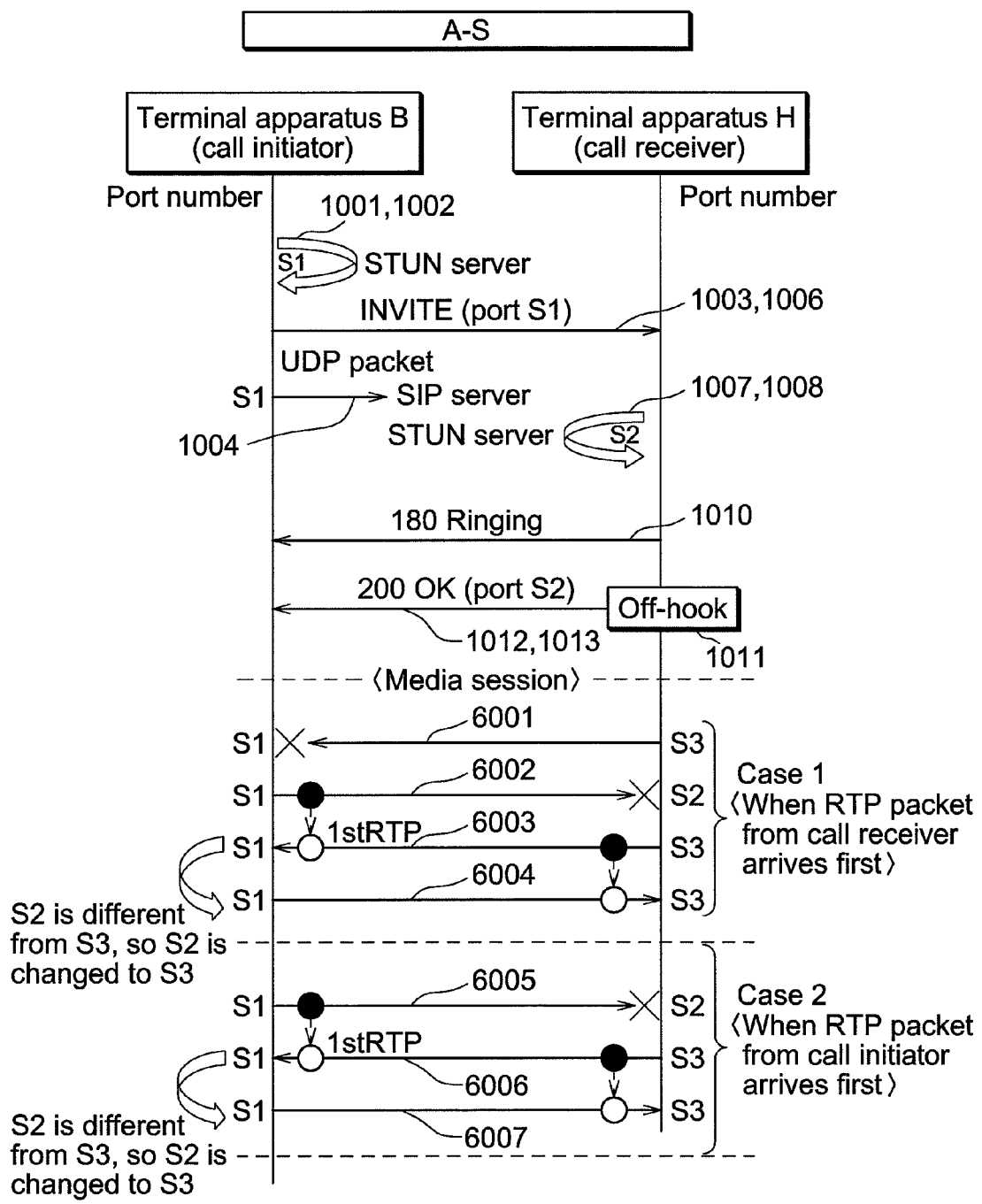
FIG. 13 illustrates a sequence of a communication process for a NAT type combination of A-S.
Figure 14:
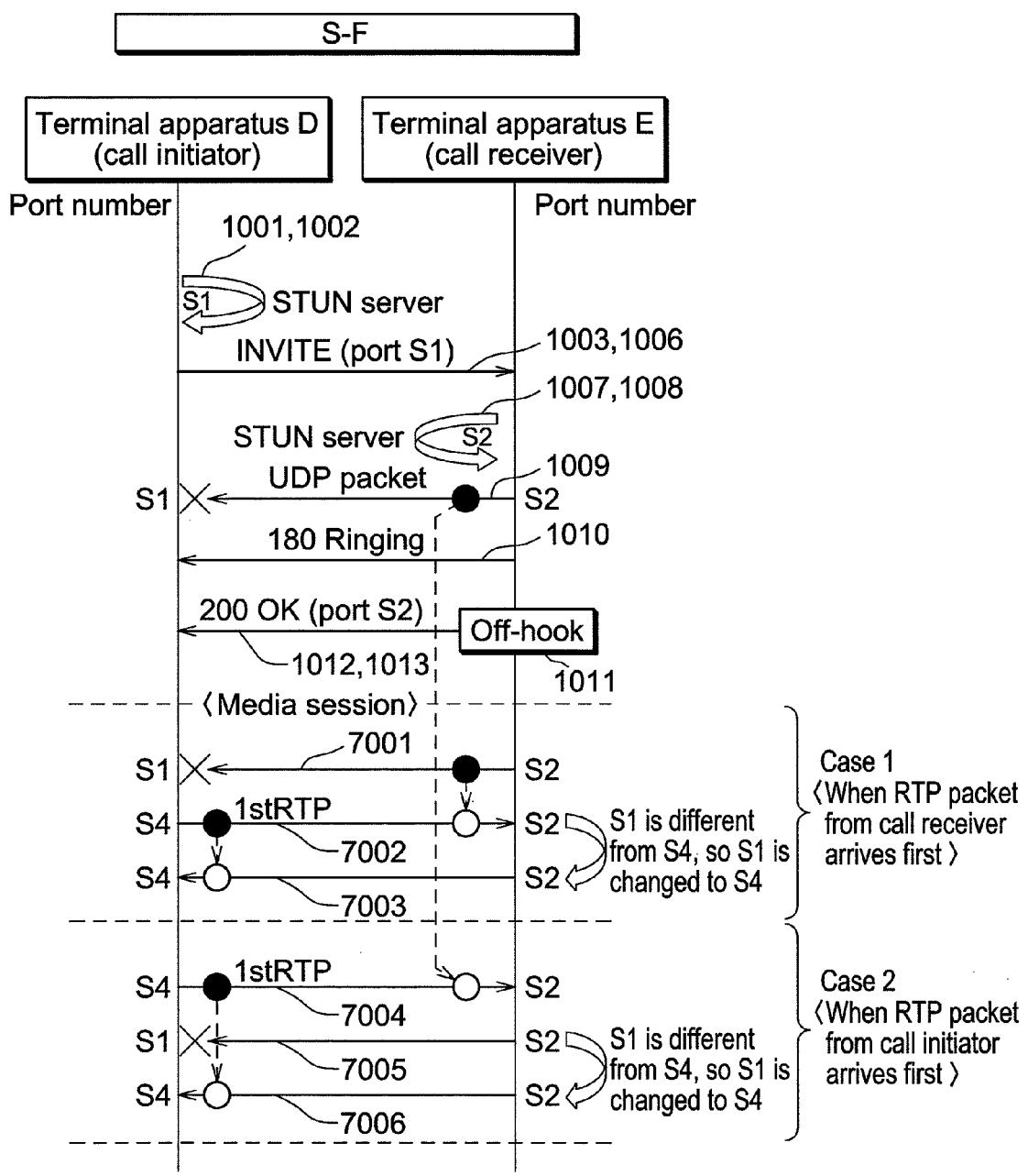
FIG. 14 illustrates a sequence of a communication process for a NAT type combination of S-F.

FIGS. 12 to 14 illustrate NAT types F-S, A-S, and S-F respectively, as exemplary communication processes that use NAT traversal method B.

In case of NAT type F-S as shown in FIG. 12, a connection is established between the terminal apparatuses similar to FIG. 9 (1001 to 1011), except the following two points. One is that call-receiving terminal apparatus H does not transmit a UDP packet for keeping port number S2 because the apparatus employs symmetric NAT. The other is that a port number for communicating with terminal apparatus A is changed from port number S2 (to port number S3), which was obtained through inquiry to STUN server 3.

In a media session thereafter, in case 1, call-receiving terminal apparatus H transmits an RTP packet to port number S1 of call-initiating terminal apparatus A, which was obtained in the preceding INVITE request (5001). In this case, terminal apparatus A employs full cone NAT; and a UDP packet, which terminal apparatus A continuously transmits, keeps port number S1. Thus, the RTP packet reaches terminal apparatus A. When terminal apparatus A transmits an RTP packet to port number S2 of terminal apparatus H, which was obtained in the preceding 200 OK message (5002), terminal apparatus H (router 18) rejects the RTP packet directed to port number S2, since S3 is a port number that can receive the RTP packet from terminal apparatus A.

Terminal apparatus A, which has received the RTP packet in communication 5001, compares source port number S3 of the RTP packet with set value S2 of a destination port number to which the RTP packet is transmitted for terminal apparatus H. Since the port numbers are different, terminal apparatus A changes set value S2 of the destination port number to S3 (i.e., the value same as the source port number of the RTP packet received in communication 5001) and transmits the RTP packet (5003). In this case, immediately preceding communication 5001 from terminal apparatus H to terminal apparatus A keeps port number S3. Thus, the RTP packet from terminal apparatus A reaches terminal apparatus H. Normal communication can be performed thereafter.

In case 2, terminal apparatus A transmits an RTP packet to port number S2 of terminal apparatus H, which was obtained in the preceding 200 OK message (5004). Terminal apparatus H, however, rejects the RTP packet similar to 5002. Then, terminal apparatus H transmits the RTP packet to port number S1 of terminal apparatus A, which was obtained in the preceding INVITE request (5005). Immediately preceding communication 5004 from terminal apparatus A to terminal apparatus H allows the RTP packet to reach terminal apparatus A.

Terminal apparatus A, which has received the RTP packet in communication 5005, changes set value S2 of the destination port number to S3, and transmits the RTP packet, similar to communication 5003 (5006). In this case, immediately preceding communication 5005 from terminal apparatus H to terminal apparatus A keeps port number S3. Thus, the RTP packet from terminal apparatus A reaches terminal apparatus H. Normal communication can be performed thereafter.

The RTP packet used to determine the port change process herein shall be limited to the RTP packet received first after the connection was established with the terminal apparatus to communicate with ("1$^{st}$ RTP" in FIG. 12; the same applies to FIGS. 13 and 14). Thereby, the possibility is minimized in which an improper packet is received as a proper packet and a port number is inadvertently changed, and thus the security is improved.

In case of NAT type A-S as shown in FIG. 13, call-receiving terminal apparatus H employs symmetric NAT, and a connection is established between the terminal apparatuses similar to FIG. 12 (1001 to 1011).

In a media session thereafter, in case 1, call-receiving terminal apparatus H transmits an RTP packet to port number S1 of call-initiating terminal apparatus B, which was obtained in the preceding INVITE request (6001). In this case, a UDP packet, which terminal apparatus B continuously transmits, keeps port number S1. Since terminal apparatus B employs restricted cone NAT (same for port restricted cone NAT), however, terminal apparatus B (router 12) rejects the RTP packet from terminal apparatus H due to IP address restriction. Then, terminal apparatus B transmits an RTP packet to port number S2 of terminal apparatus H, which was obtained in the preceding 200 OK message (6002). In this case, S3 is a port number that can receive the RTP packet from terminal apparatus A, and thus terminal apparatus H (router 18) rejects the RTP packet directed to port number S2. Subsequently, when terminal apparatus H transmits the RTP packet to port number S1 of terminal apparatus B similar to communication 6001 (6003), immediately preceding communication 6002 from terminal apparatus B to terminal apparatus H releases the IP address restriction to terminal apparatus H and keeps port number S1. Thus, the RTP packet from terminal apparatus H reaches terminal apparatus B.

Terminal apparatus B, which has received the RTP packet in communication 6003, compares source port number S3 of the RTP packet with set value S2 of a destination port number to which the RTP packet is transmitted for terminal apparatus H. Since the port numbers are different, terminal apparatus B changes set value S2 of the destination port number to S3 and transmits the RTP packet (6004). In this case, immediately preceding communication 6003 from terminal apparatus H to terminal apparatus B keeps port number S3. Thus, the RTP packet from terminal apparatus B reaches terminal apparatus H. Normal communication can be performed thereafter.

In case 2, terminal apparatus B transmits an RTP packet to port number S2 of terminal apparatus H, which was obtained in the preceding 200 OK message (6005). Terminal apparatus H, however, rejects the RTP packet similar to 6002. Then, terminal apparatus H transmits the RTP packet to port number S1 of terminal apparatus B, which was obtained in the preceding INVITE request (6006). The RTP packet reaches terminal apparatus B similar to 6003.

Terminal apparatus B, which has received the RTP packet in communication 6006, changes set value S2 of the destination port number to S3, and transmits the RTP packet, similar to communication 6004 (6007). In this case, immediately preceding communication 6006 from terminal apparatus H to terminal apparatus B keeps port number S3. Thus, the RTP packet from terminal apparatus B reaches terminal apparatus H. Normal communication can be performed thereafter.

In case of NAT type S-F as shown in FIG. 14, a connection is established between the terminal apparatuses substantially similar to FIG. 12 (1001 to 1011), except that call-initiating terminal apparatus D employs symmetric NAT.

In a media session thereafter, in case 1, call-receiving terminal apparatus E transmits an RTP packet to port number S1 of call-initiating terminal apparatus D, which was obtained in the preceding INVITE request (7001). In this case, S4 is a port number that can receive the RTP packet from terminal apparatus E, and thus terminal apparatus D (router 14) rejects the RTP packet directed to port number S1. Then, terminal apparatus D transmits an RTP packet to port number S2 of terminal apparatus E, which was obtained in the preceding 200 OK message (7002). In this case, terminal apparatus E employs full cone NAT; and immediately preceding communication 7001 from terminal apparatus E to terminal apparatus D (or a UDP packet that terminal apparatus E continuously transmits) keeps port number S2. Thus, the RTP packet from terminal apparatus D reaches terminal apparatus E.

Terminal apparatus E, which has received the RTP packet in communication 7002, compares source port number S4 of the RTP packet with set value S1 of a destination port number to which the RTP packet is transmitted for terminal apparatus D. Since the port numbers are different, terminal apparatus E changes set value S1 of the destination port number to S4 and transmits the RTP packet (7003). In this case, immediately preceding communication 7002 from terminal apparatus D to terminal apparatus E keeps port number S4. Thus, the RTP packet from terminal apparatus E reaches terminal apparatus D. Normal communication can be performed thereafter.

In case 2, terminal apparatus D transmits an RTP packet to port number S2 of call-initiating terminal apparatus E, which was obtained in the preceding 200 OK message (7004). In this case, the UDP packet, which terminal E continuously transmits, keeps port number S2, and thus the RTP packet from terminal apparatus D reaches terminal apparatus E. When terminal apparatus E transmits the RTP packet to port number S1 of terminal apparatus D, which was obtained in the preceding INVITE request (7005), terminal apparatus B rejects the RTP packet similar to communication 7001.

Terminal apparatus E, which has received the RTP packet in communication 7004, changes set value S1 of the destination port number to S4, similar to communication 7003, and transmits the RTP packet (7006). In this case, immediately preceding communication 7005 from terminal apparatus D to terminal apparatus E keeps port number S4. Thus, the RTP packet from terminal apparatus D reaches terminal apparatus E. Normal communication can be performed thereafter.

In addition to above-described F-S, A-S, and S-F, the communications similar to above can be performed for NAT type combinations to which method B is applicable.

The present invention was explained in detail with a specific embodiment, which is, however, construed as merely exemplary and non-limiting. In communications between terminal apparatuses A to H explained in the present embodiment, for instance, terminal apparatuses A to H may be able to communicate in a similar manner to an apparatus connected to an IP network other than Internet 5 or PSTN network. In this case, identification information can be added to a call control message exchanged between the terminal apparatuses, in order to identify the terminal apparatuses having the function that can embody the present invention.

The IP communication apparatus, the IP communication system and the IP communication method of such an apparatus and system according to the present invention are capable of improving a feasible range of NAT traversal in a simple and secure manner with respect to a combination of NAT types of relay apparatuses in communication of the IP communication apparatus with a destination apparatus via relay apparatuses that have a NAT function, and thus effective as an IP communication apparatus, which is connected to a wide-area network via a relay apparatus having a NAT function, an IP communication system having such an apparatus, and an IP communication method for such an apparatus and system.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2007-072109 filed on Mar. 20, 2007, entire content of which is expressly incorporated by reference herein.

What is claimed is:

1. An IP communication apparatus that performs communication on a network with a destination apparatus via a relay apparatus that has a network address translation (NAT) function, the IP communication apparatus comprising:
    a NAT information obtainer that communicates with a STUN server connected to the network to obtain NAT type information of the relay apparatus to which the IP communication apparatus is connected;

an address information obtainer that communicates with the STUN server to obtain address information of the relay apparatus;

a signaling unit that transmits a first signal to and receives a second signal from the destination apparatus, using the address information of the relay apparatus obtained by the address information obtainer as address information of the IP communication apparatus, via a SIP server in order to establish a connection with the destination apparatus;

a communication manager that determines whether the relay apparatus implements a symmetric NAT based on the NAT type information obtained by the NAT information obtainer after the signaling unit transmits the first signal, and periodically transmits, after the signaling unit transmits the first signal before the signaling unit receives the second signal, a dummy packet to the SIP server to keep the address information of the relay apparatus, when it is determined that the relay apparatus does not implement the symmetric NAT; and a data communicator that receives first media data from the destination apparatus and transmits second media data to the destination apparatus after the connection is established, wherein the communication manager determines a destination port number of the second media data according to the second signal received from the destination apparatus for establishing the connection, the communication manager obtains a source port number from the first media data received by the data communicator, and the communication manager further compares the obtained source port number with the determined destination port number and replaces the determined destination port number with the obtained source port number, when the obtained source port number is different from the determined destination port number.

2. The IP communication apparatus according to claim 1, wherein the address information obtainer obtains a global address and a port number of the relay apparatus as the address information from the STUN server, and the communication manager transmits the dummy packet periodically, to keep the port number of the relay apparatus for receiving a packet from the destination apparatus.

3. An IP communication apparatus that performs communication with a destination apparatus via a network, the IP communication apparatus connecting with the network via a first relay apparatus having first network address translation (NAT) function and the destination apparatus connecting with the network via a second relay apparatus having second NAT function, the IP communication apparatus comprising:

a NAT information obtainer that communicates with a STUN server connected to the network to obtain NAT type information of the first relay apparatus;

an address information obtainer that communicates with the STUN server to obtain a first global address and a first port number of the first relay apparatus;

a transmitter that transmits the first global address and the first port number of the first relay apparatus to the destination apparatus via a SIP server;

a receiver that receives a second global address and a second port number of the destination apparatus from the destination apparatus;

a controller that determines whether the first relay apparatus implements a symmetric NAT based on the NAT type information obtained by the NAT information obtainer after the transmitter transmits the first global address and the first port number, and periodically transmits, after the transmitter transmits the first global address and the first port number before the receiver receives the second global address and the second port number, a dummy packet to the SIP server to keep the first port number of the first relay apparatus, when it is determined that the first relay apparatus does not implement the symmetric NAT; and a data communicator that receives first media data from the destination apparatus and that transmits second media data to the destination apparatus, wherein the controller compares the second port number and a port number included in the received first media data, and sets the port number included in the received first media data as a destination port number for transmitting the second media data, when the second port number is different from the port number included in the first media data.

4. A communication apparatus connected to a network via a router having a network address translation (NAT) function, the network being connected to a SIP server and a terminal, the communication apparatus comprising:

a NAT information obtainer that communicates with a STUN server connected to the network to obtain NAT type information of the router to which the communication apparatus is connected;

an address information obtainer that communicates with the STUN server to obtain address information of the router;

a call controller configured to establish a communication, by a predetermined process, between the communication apparatus and the terminal via the SIP server, the call controller obtaining a global IP address and a port number of the terminal during the predetermined process, the predetermined process including transmission of a first signal to and reception of a second signal from the terminal using the address information of the router obtained by the address information obtainer as address information of the communication apparatus; and a data communication controller that determines whether the router implements a symmetric NAT based on the NAT type information obtained by the NAT information obtainer after the call controller transmits the first signal, and periodically transmits, after the call controller transmits the first signal before the call controller receives the second signal, a dummy packet to the SIP server to keep the address information of the router, when it is determined that the router does not implement a symmetric NAT, wherein the data communication controller sends first packet data to the terminal using the global IP address and the port number obtained by the call controller, after the communication is established, and receives second packet data from the terminal, the received second packet data from the terminal including the port number of the terminal, wherein the data communication controller compares the port number obtained by the call controller with the port number included in the received second packet data, and sends the first packet data to the terminal using the port number included in the received second packet data, after the data communication controller receives the second packet data from the terminal, when the port number obtained by the call controller is different from the port number included in the received second packet data.

5. An IP communication method for an IP communication apparatus for performing communication on a network with a destination apparatus via a relay apparatus that has a network address translation (NAT) function, the IP communication method comprising:

communicating with a STUN server connected to the network to obtain NAT type information of the relay apparatus to which the IP communication apparatus is connected;

communicating with the STUN server to obtain address information of the relay apparatus;

transmitting a first signal to and receiving a second signal from the destination apparatus via a SIP server in order to establish a connection with the destination apparatus using the obtained address information of the relay apparatus, as address information of the IP communication apparatus;

determining whether the relay apparatus implements a symmetric NAT based on the NAT type information obtained from the STUN server after the transmission of the first signal;

periodically transmitting, after the transmission of the first signal before reception of the second signal, a dummy packet to the SIP server to keep the address information of the relay apparatus, when it is determined that the relay apparatus does not implement the symmetric NAT;

determining a destination port number according to the second signal received for establishing the connection;

receiving first media data from the destination apparatus after the connection is established, the first media data including a source port number of the destination apparatus;

obtaining the source port number from the first media data;

comparing the obtained source port number with the determined destination port number;

replacing the determined destination port number with the obtained source port number, when the obtained source port number is different from the determined destination port number; and transmitting second media data to the destination apparatus according to the destination port number.

* * * * *